(12) United States Patent
Lo

(10) Patent No.: US 11,143,347 B2
(45) Date of Patent: Oct. 12, 2021

(54) GARDENING FLUID CONNECTION DEVICE

(71) Applicant: Yuan Mei Corp., Chang Hua Hsien (TW)

(72) Inventor: Shun-Nan Lo, Chang Hua Hsien (TW)

(73) Assignee: Yuan Mei Corp., Chang Hua Hsien (TW)

(*) Notice: Subject to any disclaimer, the term of this patent is extended or adjusted under 35 U.S.C. 154(b) by 726 days.

(21) Appl. No.: 15/920,930

(22) Filed: Mar. 14, 2018

(65) Prior Publication Data
US 2019/0285216 A1    Sep. 19, 2019

(51) Int. Cl.
| | | |
|---|---|---|
| *F16L 37/10* | (2006.01) | |
| *F16L 37/138* | (2006.01) | |
| *F16L 37/12* | (2006.01) | |
| *B05B 15/65* | (2018.01) | |

(52) U.S. Cl.
CPC ............. *F16L 37/138* (2013.01); *F16L 37/10* (2013.01); *F16L 37/122* (2013.01); *B05B 15/65* (2018.02)

(58) Field of Classification Search
CPC ....... F16L 37/138; F16L 37/122; F16L 37/10; F16L 33/224; B05B 15/65
See application file for complete search history.

(56) References Cited

U.S. PATENT DOCUMENTS

| | | |
|---|---|---|
| 5,871,241 A | 2/1999 | Van Essen |
| 7,021,669 B1 | 4/2006 | Lindermeir et al. |
| 2005/0006896 A1* | 1/2005 | Naito ............... F16L 37/138 285/316 |
| 2008/0238087 A1* | 10/2008 | Wang ............... F16L 37/0985 285/39 |
| 2010/0295292 A1* | 11/2010 | Wang ............... F16L 33/224 285/24 |
| 2011/0121561 A1* | 5/2011 | Wang ............... F16L 37/0985 285/148.2 |

FOREIGN PATENT DOCUMENTS

| | | |
|---|---|---|
| CA | 2368819 A1 | 10/2000 |
| DE | 1775302 A1 | 5/1971 |
| DE | 2651855 A1 | 5/1978 |
| DE | 3490017 T1 | 2/1985 |
| DE | 19915291 A1 | 10/2000 |

(Continued)

*Primary Examiner* — Matthew Troutman
*Assistant Examiner* — James A Linford
(74) *Attorney, Agent, or Firm* — Stinson LLP

(57) ABSTRACT

A gardening fluid connection device contains a body including multiple retainers, a resilient element, and a fitting sleeve including multiple spaced engagement teeth. The resilient element abuts against the body and the fitting sleeve. The body includes a stop rib, and the multiple spaced engagement teeth are pushed by the resilient element to abut against the stop rib. The body includes at least one retaining element, each retaining element is located on a first side of each spaced engagement tooth, and a width of each spaced engagement tooth is equal to a rotation distance of the fitting sleeve, hence the fitting sleeve is rotated reciprocatingly to open or close of the gardening fluid coupling device by using the stop rib, each retaining element, each spaced engagement tooth and the resilient element, and each retaining element is stopped when moving to a second side of each spaced engagement tooth.

7 Claims, 10 Drawing Sheets

(56) References Cited

FOREIGN PATENT DOCUMENTS

| EP | 1166003 | A1 | 1/2002 |
|---|---|---|---|
| JP | 3676498 | B2 | 5/2005 |
| TW | 532442 | | 3/1991 |
| TW | 260238 | | 10/1995 |
| TW | I319072 | | 2/1996 |
| WO | WO0060269 | A1 | 10/2000 |

* cited by examiner

GARDENING FLUID CONNECTION DEVICE

TECHNICAL FIELD

The present disclosure relates to a gardening fluid connection device which is employed to connect with a water spray gun, a sprinkler or a water hose.

BACKGROUND

A conventional gardening fluid connection device, such as disclosed in TW Patent Nos. 260238, 532442, 11319072 and U.S. Pat. No. 7,021,669, is employed to connect with a water supply device (e.g., a water spray gun, a sprinkler, or a water hose). The conventional gardening fluid connection device contains a fitting sleeve reciprocatingly rotated leftward or rightward so as to open or close the conventional gardening fluid connection device. When the fitting sleeve is stopped after being rotated, the user knows the conventional gardening fluid connection device is located on an opening position or a closing position. Alternatively, the user knows the conventional gardening fluid connection device is located on the opening position or the closing position after pressing the fitting sleeve. Furthermore, a conventional gardening fluid connection device such as disclosed in U.S. Pat. No. 7,021,669 contains an L-shaped depression defined in the fitting sleeve so that the stop rib of the fitting sleeve slides in a stopping face of the depression when being rotated to the closing position or the opening position, hence the conventional gardening fluid connection device is not positioned.

SUMMARY

A primary aspect of the present invention is to provide a gardening fluid coupling device which is opened or closed easily by way of the stop rib and each locking element of the body, each spaced engagement tooth of the fitting sleeve, and the resilient element.

Another aspect of the present invention is to provide a gardening fluid coupling device in which each locking element rotates from a first side of each spaced engagement tooth toward the second side of each spaced engagement tooth, wherein each spaced engagement tooth is pushed by the resilient element to contact with the stop rib and each locking element of the body and to rotate toward the second side of each spaced engagement tooth, and each locking element rotates to the second side of each spaced engagement tooth, such that it is easy to distinguish whether the gardening fluid coupling device is opened or closed.

In an aspect, a gardening fluid connection device comprises a body on which multiple retainers are retained, a resilient element, and a fitting sleeve which are fitted on a first end of the body. The fitting sleeve includes multiple spaced engagement teeth and the resilient element abuts against the body and the fitting sleeve. Also, the fitting sleeve rotates along the body reciprocatingly and pushes the resilient element so as to open or close the gardening fluid coupling device, hence the multiple retainers of the body are removed or retained when the fitting sleeve presses the resilient element or is pushed by the resilient element so that the multiple retainers of the body connect with or remove from a water spray gun or a sprinkler. The body includes a stop rib arranged thereon so that the multiple spaced engagement teeth of the fitting sleeve are pushed by the resilient element to abut against the stop rib of the body. The body also includes at least one locking element formed inside the stop rib, wherein each locking element is located on a first side of each spaced engagement tooth, and wherein a width of each spaced engagement tooth is equal to a rotation distance of the fitting sleeve, such that the fitting sleeve is rotated reciprocatingly so as to open or close the gardening fluid coupling device by way of the stop rib and each locking element of the body, each spaced engagement tooth of the fitting sleeve, and the resilient element. Further, each locking element is stopped when moving to a second side of each spaced engagement tooth.

In another aspect, a gardening fluid connection device comprises a body on which multiple retainers are retained, a resilient element, and a fitting sleeve which are fitted on a first end of the body. The fitting sleeve includes multiple spaced engagement teeth and the resilient element abuts against the body and the fitting sleeve. Also, the fitting sleeve rotates along the body reciprocatingly and pushes the resilient element so as to open or close the gardening fluid coupling device, hence the multiple retainers of the body are removed or retained when the fitting sleeve presses the resilient element or is pushed by the resilient element so that the multiple retainers of the body connect with or remove from a water spray gun or a sprinkler. The body further includes at least one retaining element, and the fitting sleeve further includes at least one shoulder respectively located above and contacting with the retaining element so as to maintain the fitting sleeve on a closing position and not press downward when the fitting sleeve rotates to an opening position. The shoulder removes from the retaining element of the body so that the fitting sleeve presses the resilient element to release the multiple retainers, and the multiple retainers connect with or remove from the water spray gun or the sprinkler.

In yet another aspect, a gardening fluid connection device comprises a body on which multiple retainers are retained, a resilient element, and a fitting sleeve which are fitted on a first end of the body. The fitting sleeve includes multiple spaced engagement teeth and the resilient element abuts against the body and the fitting sleeve. Also, the fitting sleeve rotates along the body reciprocatingly and pushes the resilient element so as to open or close the gardening fluid coupling device, hence the multiple retainers of the body are removed or retained when the fitting sleeve presses the resilient element or is pushed by the resilient element so that the multiple retainers of the body connect with or remove from a water spray gun or a sprinkler. The body includes a stop rib arranged thereon so that the multiple spaced engagement teeth of the fitting sleeve are pushed by the resilient element to abut against the stop rib of the body. The body also includes at least one locking element formed inside the stop rib, wherein each locking element is located on a first side of each spaced engagement tooth, and wherein a width of each spaced engagement tooth is equal to a rotation distance of the fitting sleeve, such that the fitting sleeve is rotated reciprocatingly, and each locking element rotates from a first side of each spaced engagement tooth toward the second side of each spaced engagement tooth. The body further includes at least one retaining element, and the fitting sleeve further includes at least one shoulder respectively located above and contacting with the one or more than one retaining element so as to maintain the fitting sleeve on a closing position and not press downward when the fitting sleeve rotates to an opening position. The shoulder removes from the one or more than one retaining element of the body so that the fitting sleeve presses the resilient element to release the multiple retainers, and the multiple retainers connect with or remove from the water spray gun or the sprinkler.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
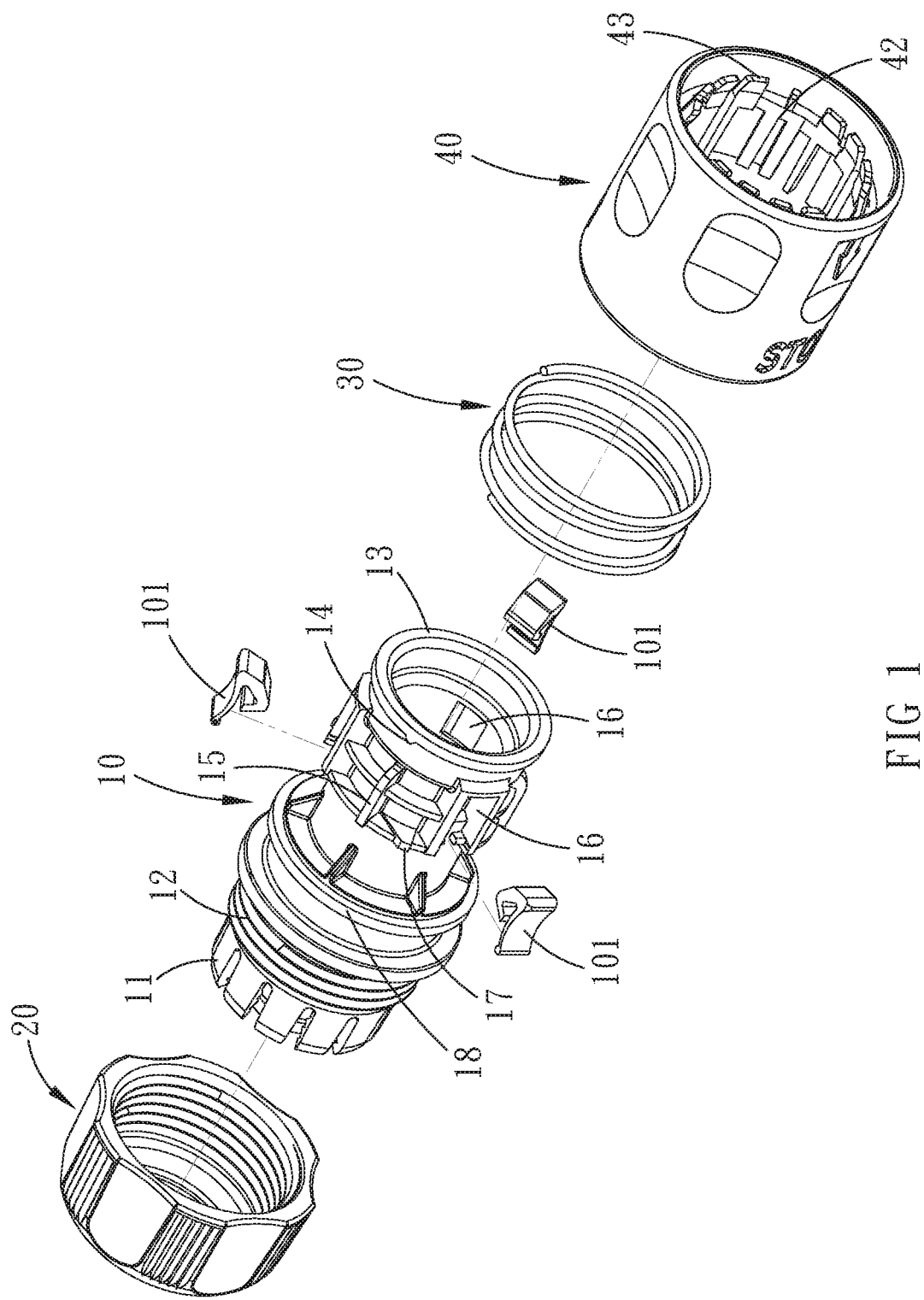
FIG. 1 is a perspective view showing exploded components of a gardening fluid coupling device according to an embodiment of the present invention.
Figure 2:
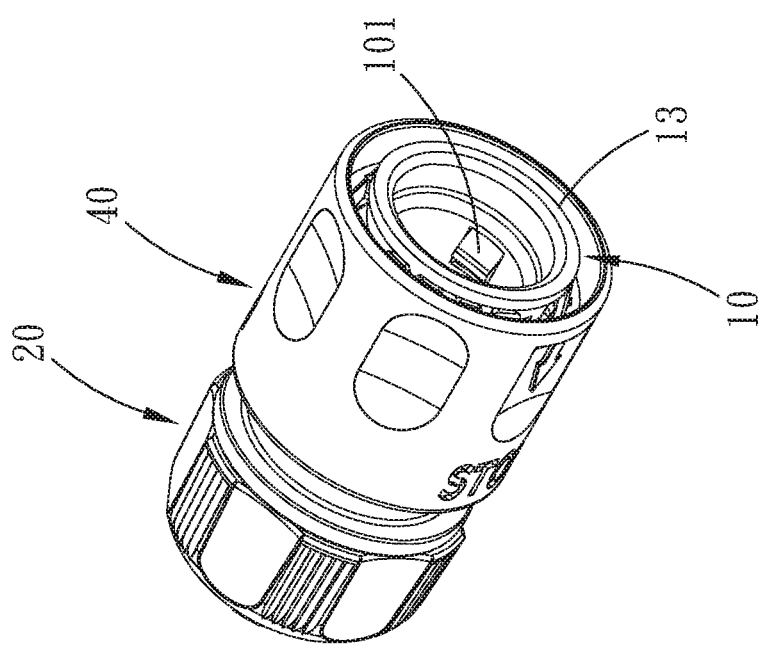
FIG. 2 is a perspective view showing the assembly of the gardening fluid coupling device of FIG. 1.
Figure 3:
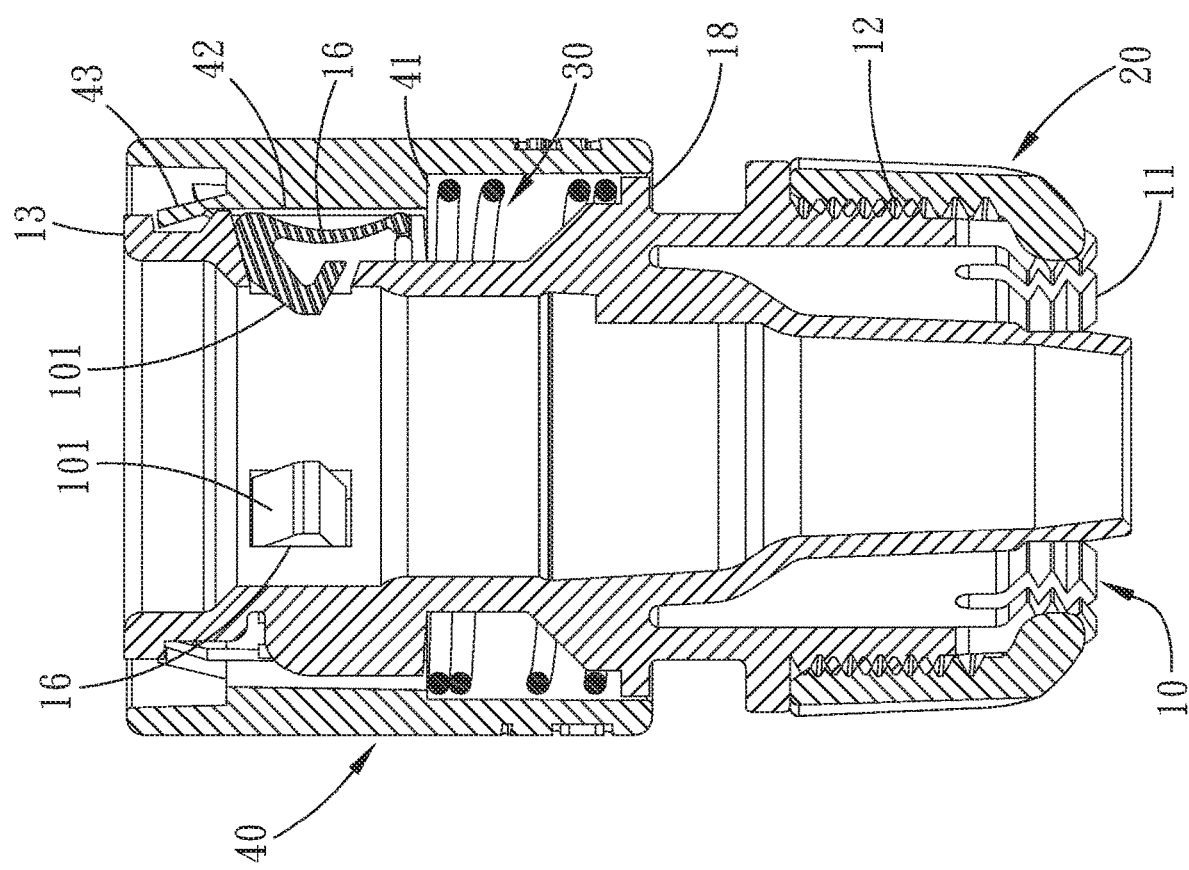
FIG. 3 is a cross sectional view showing the assembly of the gardening fluid coupling device of FIG. 1.

With reference to FIGS. 1 to 3, a gardening fluid connection device according to a preferred embodiment of the present invention comprises: a body 10 on which multiple retainers 101 are retained, a screwing sleeve 20 mounted on a first end of the body 10 and configured to connect with a water hose, a resilient element 30, and a fitting sleeve 40, which are fitted with a second end of the body 10 The resilient element 30 and the fitting sleeve 40 abut against each other so that the fitting sleeve 40 rotates along the body 10 reciprocatingly and pushes the resilient element 30 so as to open or close of the gardening fluid coupling device, hence the multiple retainers 101 of the body 10 are removed or retained when the fitting sleeve 40 presses the resilient element 30 or is pushed by the resilient element 30 so that the multiple retainers 101 of the body 10 connect with or remove from a water supply device, such as a water spray gun or a sprinkler. The body 10 includes multiple flexible teeth 11 arranged on the first end thereof, a threaded section 12 formed inside the multiple flexible teeth 11 and configured to screw with the screwing sleeve 20, a stop rib 13 arranged on the second end of the body 10, one or more than one locking element 14 (i.e., each locking element 14 is a boss) formed inside the stop rib 13, multiple limitation elements 15 arranged inside the one or more than one locking element 14 and away from the stop rib 13, and multiple spaced orifices 16 configured to accommodate the multiple retainers 101 respectively and located adjacent to the stop rib 13. In this embodiment, each of the multiple limitation elements 15 is defined between any two of the multiple spaced orifices 16 and is an extending rib.

Figure 4:
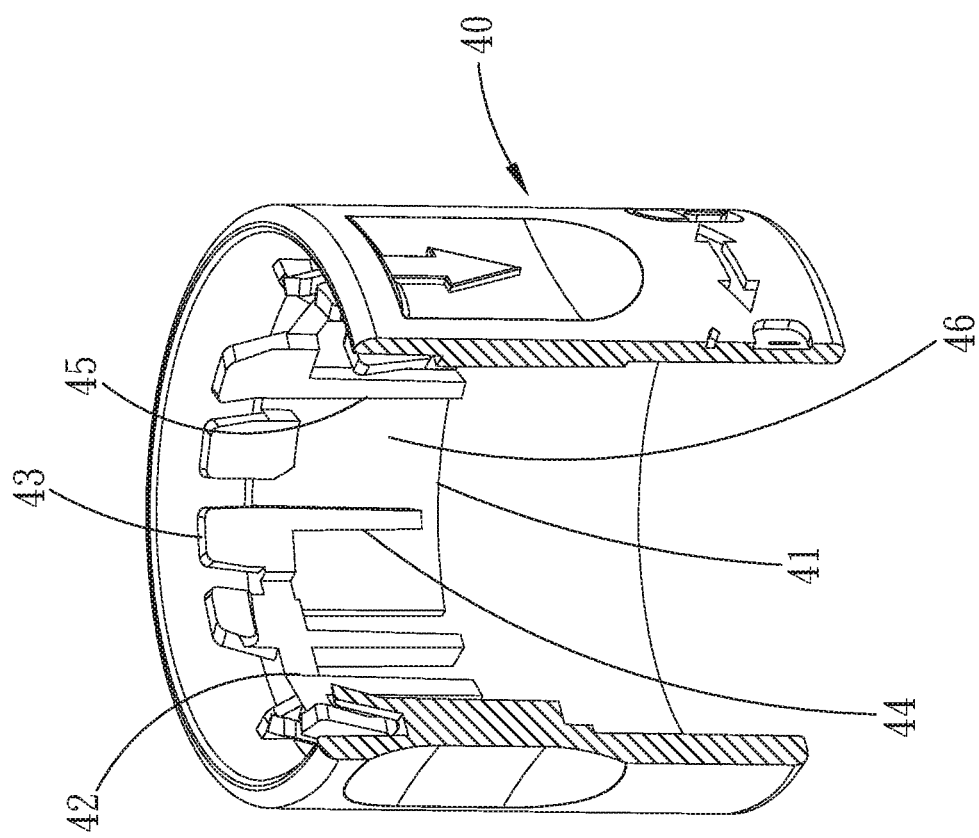
FIG. 4 is a perspective view of a fitting sleeve of the gardening fluid coupling device of FIG. 1 having a portion cut away.

Referring further to FIGS. 1 to 3, the body 10 includes one or more than one retaining element 17 (which is a protrusion). Each retaining element 17 is defined between each limitation element 15 and each spaced orifice 16. The body 10 further includes a surround seat 18 arranged on a middle section thereof and abutting against the resilient element 30. In an embodiment, the resilient element 30 is a spring. The fitting sleeve 40 (as shown in FIG. 4) includes a fixing seat 41 formed on a middle section of an inner wall of the fitting sleeve 40 and abutting against the resilient element 30. Multiple guide zones 42 are defined by elongated ribs and correspond to the multiple spaced orifices 16 respectively, wherein the multiple guide zones 42 abut against the multiple retainers 101 individually. Multiple spaced engagement teeth 43 are defined between any two adjacent of the multiple guide zones 42 so as to be pushed by the resilient element 30 and contacts with the stop rib 13 of the body 10. And the one or more than one locking element 14 is located beside each of the multiple spaced engagement teeth 43 so that the resilient element 30 pushes the fixing seat 41 of the fitting sleeve 40 and the surround seat 18 of the body 10.

The fitting sleeve 40 further includes one or more than one elongated shoulder 44 respectively corresponding to and located above the one or more than one retaining element 17 so that the one or more than one elongated shoulder 44 moves across the one or more than one retaining element 17 when the fitting sleeve 40 is rotated. Each elongated shoulder 44 has a stopping face 45 defined on one side thereon so as to form a defining space 46, such that each limitation element 15 is located in the defining space 46 and is limited by each elongated shoulder 44 and the stopping face 45 when the fitting sleeve 40 rotates reciprocatingly. A width of each of the multiple spaced engagement teeth 43 is equal to a rotation distance of the fitting sleeve 40 in an embodiment.

Figure 5:
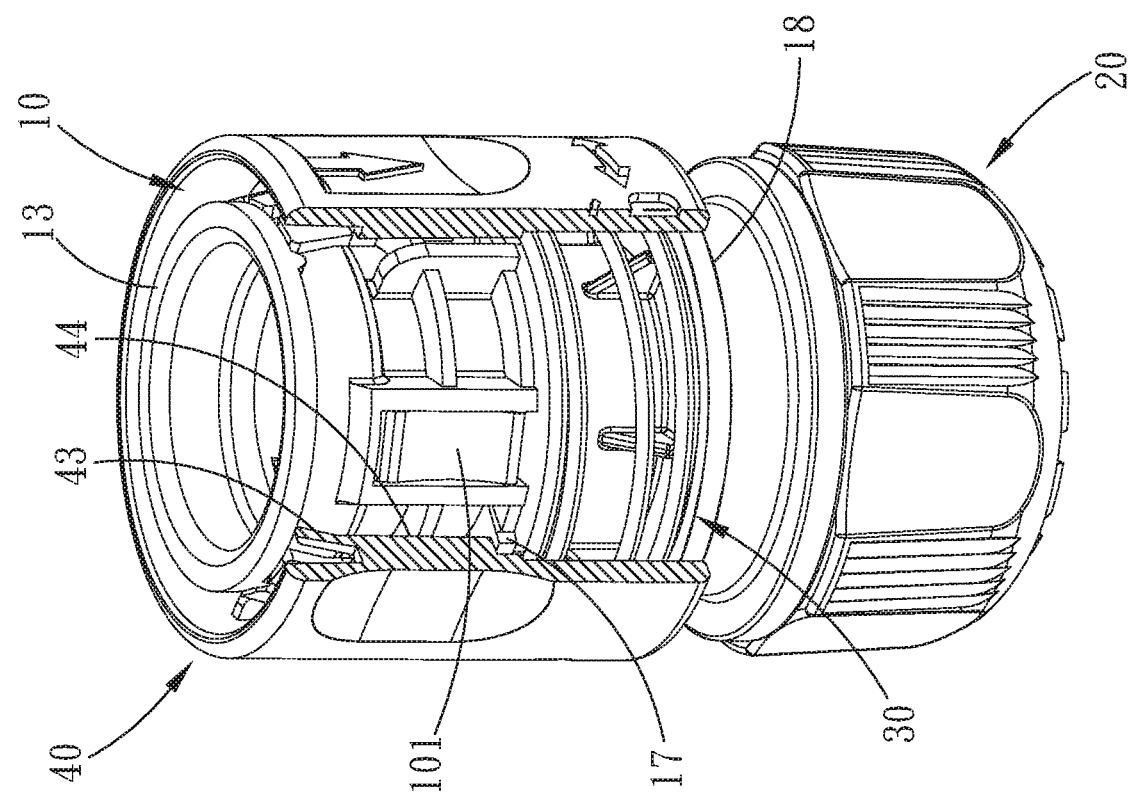
FIG. 5 is a perspective view showing the operation of the gardening fluid coupling device of FIG. 1, including the fitting sleeve of FIG. 4.
Figure 6:
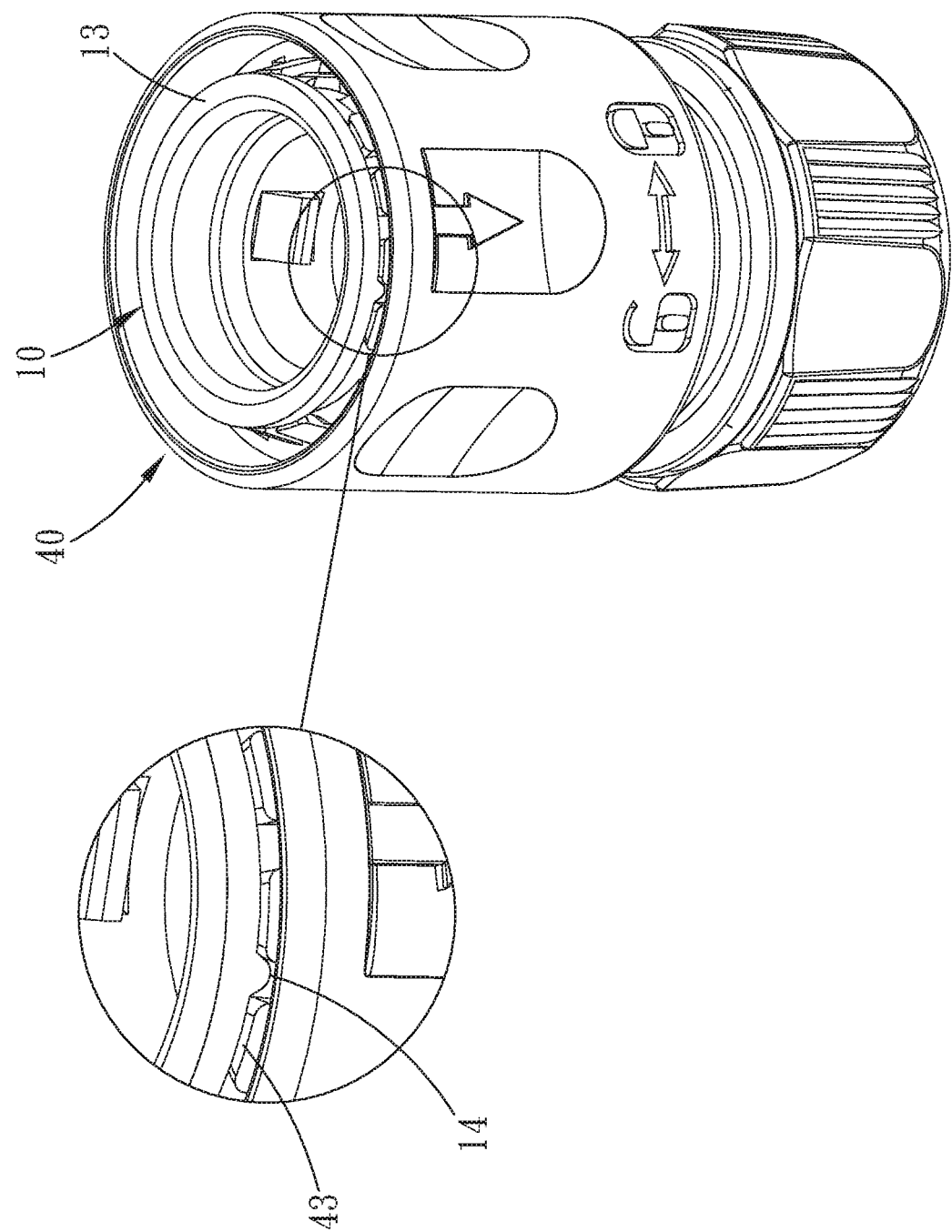
FIG. 6 is a perspective view showing the operation of the gardening fluid coupling device of FIG. 1, including an enlarged portion thereof.
Figure 7:
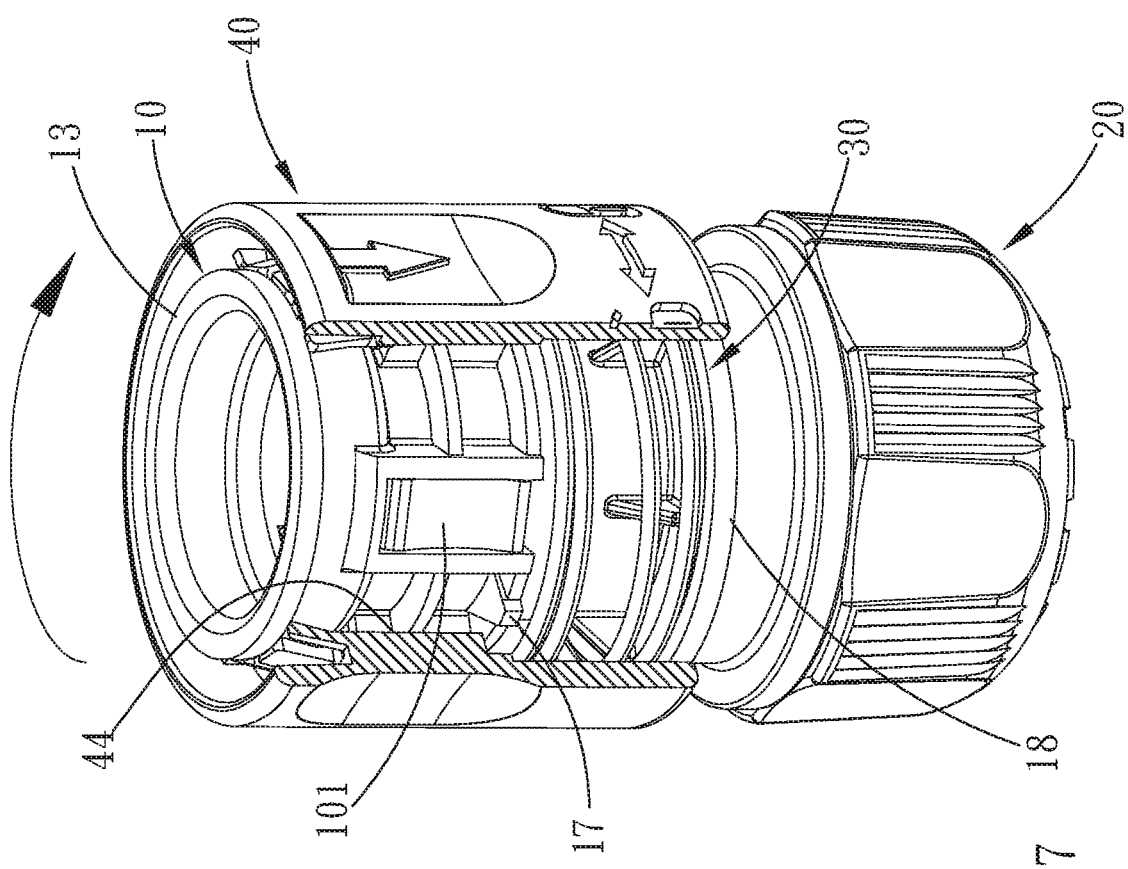
FIG. 7 is another perspective view showing the operation of the gardening fluid coupling device of FIG. 1, including the fitting sleeve of FIG. 4.
Figure 8:
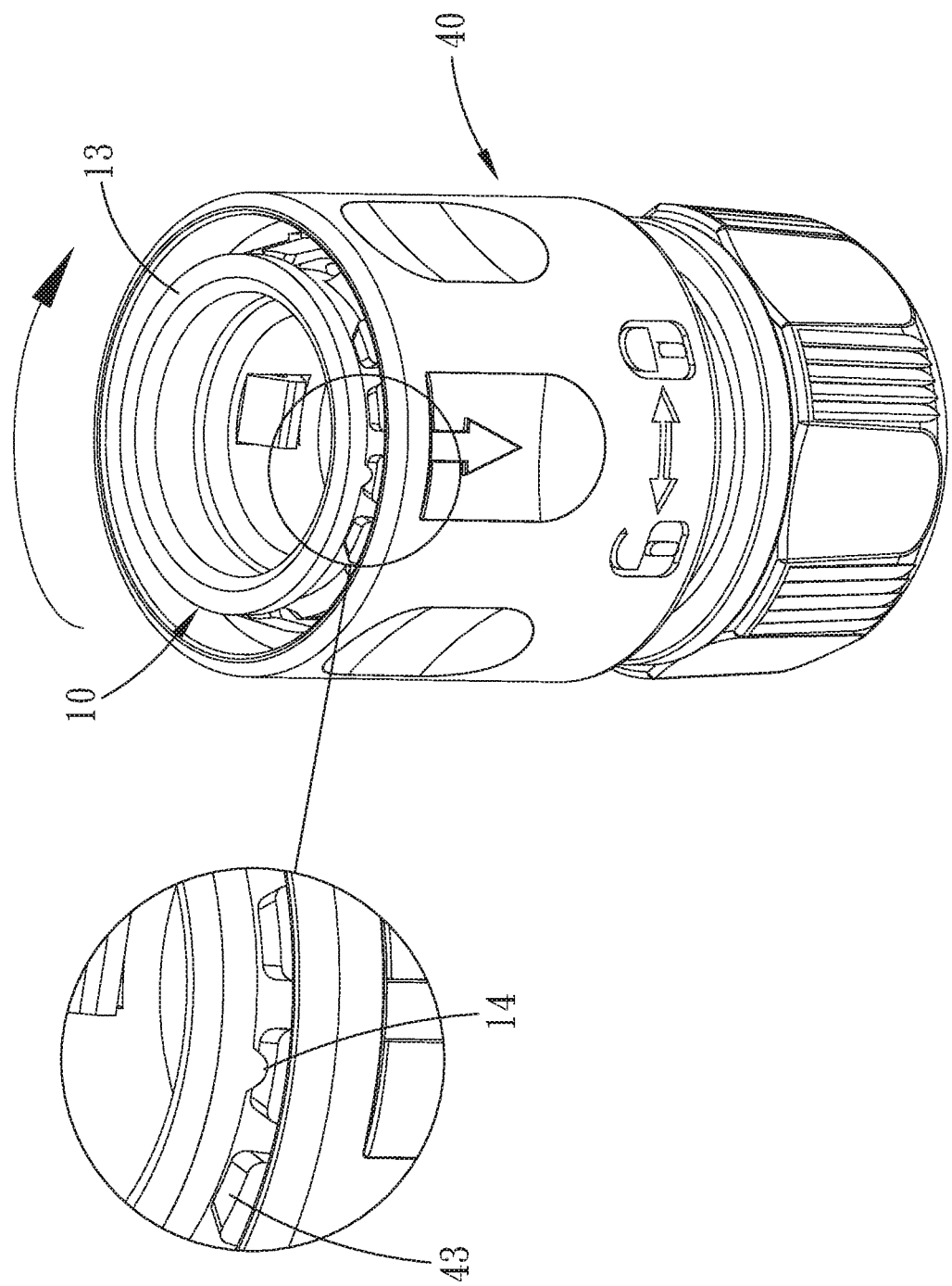
FIG. 8 is another perspective view showing the operation of the gardening fluid coupling device of FIG. 1, including an enlarged portion thereof.
Figure 9:
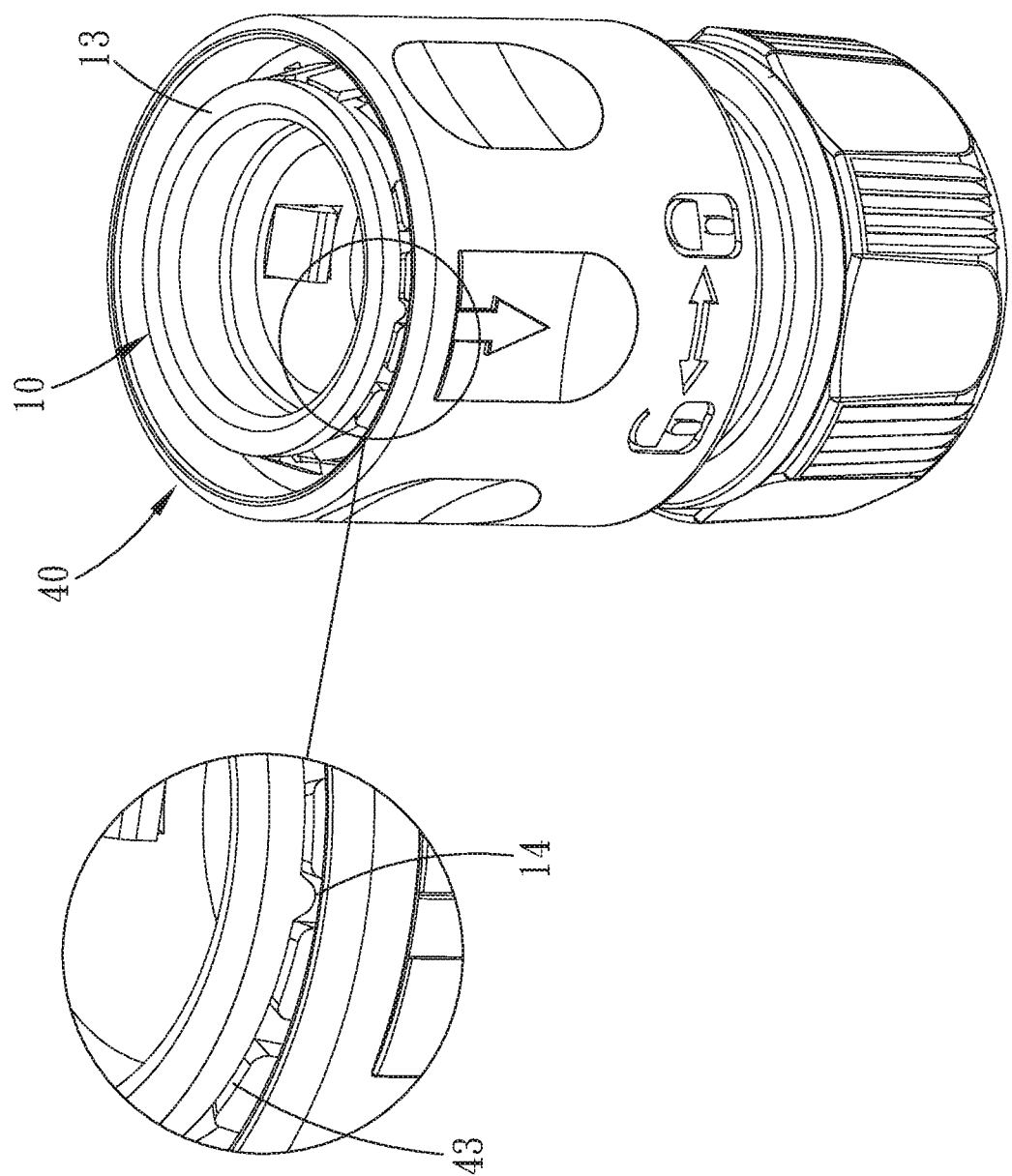
FIG. 9 is also another perspective view showing the operation of the gardening fluid coupling device of FIG. 1, including an enlarged portion thereof.
Figure 10:
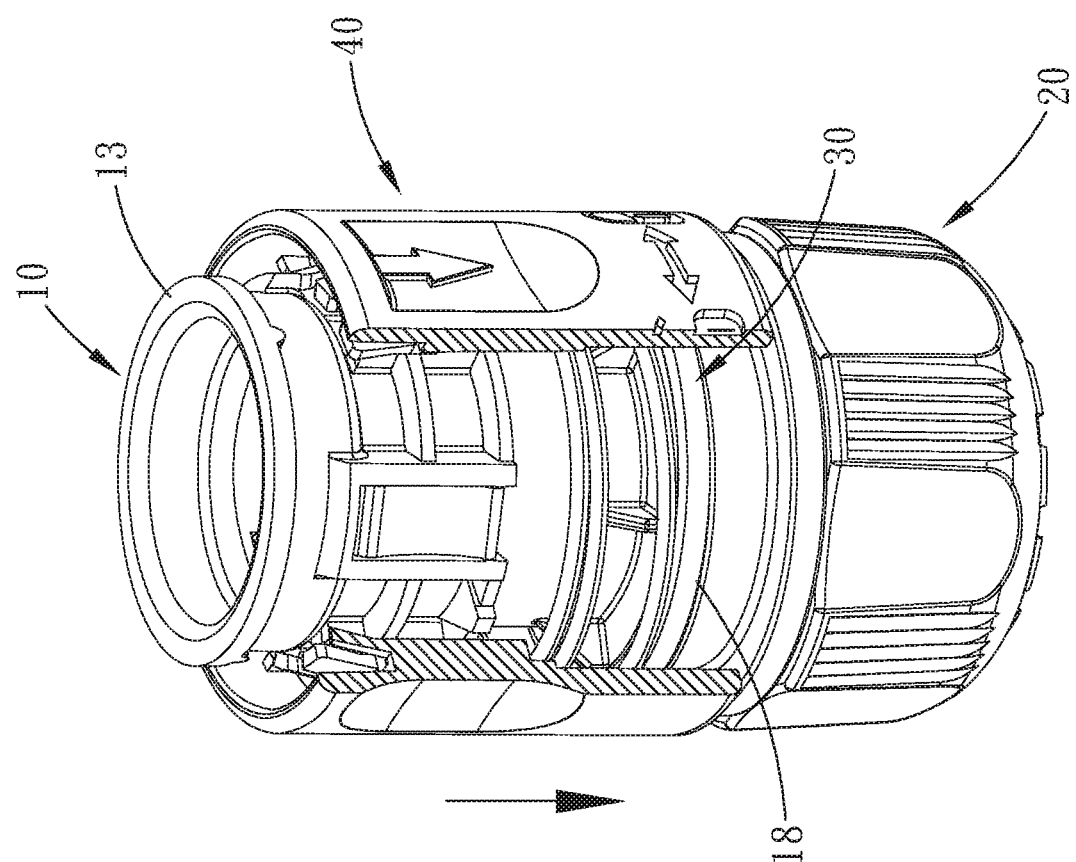
FIG. 10 is also another cross-sectional perspective view showing the operation of the gardening fluid coupling device of FIG. 1, including the fitting sleeve of FIG. 4.

Referring to FIG. 5, when the fitting sleeve 40 is located on a closing position, each elongated shoulder 44 is located above each retaining element 17 of the body 10 so that the fitting sleeve 40 does not press each retaining element 17 while the fitting sleeve 40 is pushed by the resilient element 30 so that each spaced engagement tooth 43 is biased against the stop rib 13 of the body 10, and each locking element 14 is located on a first side of each spaced engagement tooth 43 (as illustrated in FIG. 6). In this arrangement, each limitation element 15 of the body 10 contacts with the stopping face 45 of the fitting sleeve 40 and each of the multiple retainers 101 is pushed by each of the multiple guide zones 42 so as to connect with a coupling opening of the water supply device. When the fitting sleeve 40 is rotated to an opening position (as shown in FIGS. 7 and 8), each elongated shoulder 44 moves away from each retaining element 17 so that the fitting sleeve 40 presses the resilient element 30, and each locking element 14 and each spaced engagement tooth 43 are pushed by the fitting sleeve 40 to press the resilient element 30 so that each spaced engagement tooth 43 removes from the stop rib 13 and moves along each locking element 14. When each locking element 14 moves to a second side of each spaced engagement tooth 43 (as illustrated in FIG. 9), each spaced engagement tooth 43 is not forced by each locking element 14 and is pushed by the resilient element 30 so as to urge the stop rib 13 and each locking element 14 to rotate toward the second side of each spaced engagement tooth 43. Preferably, each limitation element 15 contacts with each elongated shoulder 44 so as to maintain the fitting sleeve 40 on the opening position, and the fitting sleeve 40 (as shown in FIG. 10) and the resilient element 30 are pressed until each retainer 101 of the body 10 removes from each guide zone 42, thus removing or fixing each retainer 101 from or into the coupling opening of the water spray gun or the sprinkle. Thereby, the gardening fluid coupling device is opened or closed easily by way of the stop rib 13 and each locking element 14 of the body 10, each spaced engagement tooth 43 of the fitting sleeve 40, and the resilient element 30.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

Having described the invention in detail, it will be apparent that modifications and variations are possible without departing from the scope of the invention defined in the appended claims.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A gardening fluid connection device comprising:
   a body on which a retainer is retained, the body having a first end and second end;
   a resilient element; and
   a fitting sleeve fitted on the first end of the body, the fitting sleeve including an engagement tooth, the resilient element abutting against the body and the fitting sleeve, the fitting sleeve being rotatable along the body reciprocatingly and being able to push the resilient element for opening or closing the gardening fluid connection device, hence the retainer of the body is removed or retained when the fitting sleeve pushes the resilient element or is pushed by the resilient element so that the retainer of the body connects with or removes from a water supply device;
   wherein the body includes a stop rib arranged thereon the engagement tooth of the fitting sleeve is pushed by the resilient element to abut against the stop rib of the body and at least one locking element, the locking element is formed on the stop rib protruding toward the second end of the body, the locking element is located on a first side of the engagement tooth, and a width of the engagement tooth is equal to a route distance of the engagement tooth which is moved by reciprocating rotation of the fitting sleeve, so that the locking element is shifted between the first side and a second side of the engagement tooth during reciprocating rotation of the fitting sleeve.

2. The gardening fluid connection device as claimed in claim 1:
   wherein the body further includes a limitation element arranged between the locking element and the second end of the body, an orifice being configured on the body to accommodate the retainer and being located between the stop rib and the second end of the body, the limitation element being located laterally beside the orifice,
   wherein the body further includes at least one retaining element, the retaining element being defined between the limitation element and the orifice,
   wherein the fitting sleeve includes a guide zone corresponding to the orifice, the guide zone abutting against the retainer, and
   wherein the fitting sleeve further includes at least one shoulder respectively corresponding to and located above the retaining element so that the shoulder moves across the retaining element when the fitting sleeve is rotated, the shoulder having a stopping face defined on one side thereof so as to form a defining space such that the limitation element is located in the defining space and is limited by the shoulder and the stopping face when the fitting sleeve rotates reciprocatingly.

3. The gardening fluid connection device as claimed in claim 2, wherein each limitation element is an extending rib.

4. The gardening fluid connection device as claimed in claim 2, wherein each retaining element is a protrusion, and each shoulder is elongated.

5. The gardening fluid connection device as claimed in claim 1, wherein the body further includes a surround seat arranged on a middle section thereof, and wherein the fitting sleeve includes a fixing seat formed on a middle section of an inner wall thereof such that the resilient element abuts against the surround seat and the fixing seat.

6. The gardening fluid connection device as claimed in claim 1, wherein the resilient element is a spring.

7. The gardening fluid connection device as claimed in claim 1, wherein each locking element is a boss.

* * * * *